United States Patent
Ikari et al.

(10) Patent No.: US 7,050,229 B2
(45) Date of Patent: May 23, 2006

(54) METHOD FOR MANUFACTURING REAR-PROJECTION TYPE SCREEN HAVING SHEETS WITH PROTRUSIONS INTEGRALLY FORMED THEREON

(75) Inventors: Tokuo Ikari, Tokyo (JP); Ichiro Matsuzaki, Tokyo (JP)

(73) Assignee: Kuraray Co., Ltd., Kurashiki (JP)

( * ) Notice: Subject to any disclaimer, the term of this patent is extended or adjusted under 35 U.S.C. 154(b) by 126 days.

(21) Appl. No.: 10/619,414

(22) Filed: Jul. 16, 2003

(65) Prior Publication Data

US 2004/0085637 A1    May 6, 2004

Related U.S. Application Data

(63) Continuation of application No. 09/846,306, filed on May 2, 2001, now Pat. No. 6,618,196.

(30) Foreign Application Priority Data

May 10, 2000   (JP) ............................. 2000-137287

(51) Int. Cl.
  G03B 21/60   (2006.01)
  G03B 21/56   (2006.01)
  B29D 11/00   (2006.01)
  B29C 45/14   (2006.01)
  B29C 59/02   (2006.01)

(52) U.S. Cl. ...................... 359/457; 359/460; 264/1.1; 264/259; 264/320

(58) Field of Classification Search ................ 359/449, 359/450, 456, 457, 460; 264/1.1, 2.7, 266, 264/259, 249, 320
See application file for complete search history.

(56) References Cited

U.S. PATENT DOCUMENTS

| | | | |
|---|---|---|---|
| 4,456,344 A | * | 6/1984 | Bordignon ................... 264/1.1 |
| 4,984,871 A | | 1/1991 | Martinez .................... 359/443 |
| 5,803,567 A | | 9/1998 | Nakanishi ................... 359/457 |
| 5,831,585 A | | 11/1998 | Aoki et al. ................... 345/32 |

(Continued)

FOREIGN PATENT DOCUMENTS

JP          1-142901         9/1989

(Continued)

*Primary Examiner*—Christopher E Mahoney
(74) *Attorney, Agent, or Firm*—Oblon, Spivak, McClelland, Maier & Neustadt, P.C.

(57) ABSTRACT

To provide a rear-projection type screen in which, without the need for a tape-attachment operation on the outer circumferential part of the lens sheets, the top of the Fresnel lens can be prevented from being pared by the abrasion caused by the vibration during transportation. A rear-projection type screen according to the present invention is configured from two or more overlapping sheet-like members such as a Lenticular lens sheet 1 and Fresnel lens sheet 2, in which a fixing protrusion 3 is integrally formed in the sheet-like members in such way that neither of the two sheet-like members is displaced from the state in which the two sheet-like members overlap. A protrusion, used to attach the rear-projection type screen to the main body of a rear-projection-type image display apparatus or the screen frame, may be integrally formed in the sheet-like members from which the rear-projection type screen is configured. In addition, a protrusion, which produces a gap between the top of a lens in one of the sheet-like members and the other sheet-like member in a state in which the two sheet-like members overlap, may be integrally formed in the sheet-like members.

18 Claims, 7 Drawing Sheets

U.S. PATENT DOCUMENTS

| | | | |
|---|---|---|---|
| 6,068,906 A * | 5/2000 | Sasa et al. | 264/2.7 |
| 6,275,334 B1 | 8/2001 | Park | 359/449 |
| 6,317,263 B1 | 11/2001 | Moshrefzadeh et al. | 359/460 |
| 6,348,993 B1 | 2/2002 | Hori | 359/460 |
| 6,407,859 B1 | 6/2002 | Hennen et al. | 359/457 |
| 6,645,793 B1 * | 11/2003 | Fujii et al. | 264/259 |

FOREIGN PATENT DOCUMENTS

| | | |
|---|---|---|
| JP | 2-93531 | 4/1990 |
| JP | 06038151 | 2/1994 |
| JP | 09096872 | 4/1997 |
| JP | 1-97327 | 6/1999 |

* cited by examiner

METHOD FOR MANUFACTURING REAR-PROJECTION TYPE SCREEN HAVING SHEETS WITH PROTRUSIONS INTEGRALLY FORMED THEREON

BACKGROUND OF THE INVENTION

1. Field of the Invention

The present invention relates to a rear-projection type screen employed in a rear-projection type television set.

2. Description of the Related Art

Examples of well-known rear-projection type screens of the prior art employed in rear-projection type television sets include, as shown in FIG. 10, a 2-sheet type in which a Lenticular lens sheet 1 and Fresnel lens sheet 2 are combined, and as shown in FIG. 11, a 3-sheet-type in which a Lenticular lens sheet 1, Fresnel lens sheet 2 and front plate 3 are combined. In these rear-projection type screens of the prior art—in which 2 or more plastic lenses of different thickness and material quality are combined—gaps, which have their origin in the difference in magnitude of the elongation and shrinking of the constituent members (lens sheets or front plate) with respect to changes in temperature and humidity of the surrounds, are generated between the constituent members. For this reason, rear-projection type screens (by way of example in Japanese Unexamined Utility Model Application No. Heisei 1-142901) have been configured in which, in the manufacturing stage of the lens sheets, warp is imparted in advance by the mounting of a flat surface lens sheet in a mold and the heating thereof in this state, the elastic forces of the lens sheets are utilized to closely attach the lens sheets, and the lens sheets are fixed in the screen frame in such a way that no gaps are formed.

When a television set comprising a rear-projection type screen, in which lens sheets and a front plate are fixed in the projection sheet frame, is transported for a long time, abrasion between the lens sheets occurs which is caused by vibration during transportation. As a result, the top of the Fresnel lens and the top of the Lenticular lens are pared, or the rear surface of the front plate is pared, whereby the problem of a significant reduction in television set image quality is generated. Generally, in the state in which the screen is being used, the paring of the top of the Fresnel lens and the like is generated mostly in the region of the upper and lower edge parts.

In order to solve this problem of the paring of the top of the Fresnel lens and so on, a screen in which the sharpened section of the top of the Fresnel lens is flattened (see Japanese Unexamined Patent Application No. Heisei 2-93531), and a screen in which the macroscopic cross-sectional shape of the Lenticular lens sheet is formed to approximate a spherical shape in which the curved lines and straight lines are combined (Japanese Unexamined Utility Model Application No. Heisei 1-97327), have been proposed.

However, in order for the image quality not to be reduced for screens in which the top of the Fresnel lens has been flattened, there are limits that only, a minute section of the top of the Fresnel lens, whose width at the top may be only several μm and through which the projected light does not pass must be flattened, while the shape of the other section through which the projected light passes must not be altered. For this reason, the prevention effect on the paring caused by the abrasion of the lens sheets is inadequate. In addition, in a Fresnel lens sheets for rear-projection type screens, the above-mentioned flat part of the top of the Fresnel lens which have concentric graves cannot be provided selectively in just the upper and lower edge regions of the screen through manufacturing process employing a metal mold for the lens sheet produced by cutting each single groove with a cutting tool. Thereupon, a problem arises in that the cutting must be performed to a region, from the left and right edges of the screen, in which the provision of the flat part in the top of the lens is unnecessary.

On the other hand, in a screen in which the macroscopic cross-sectional shape of the Lenticular lens sheet is an approximately spherical shape in which the curved lines and straight lines are combined, gaps are generated between both lens sheets in a region in which the macroscopic cross-sectional shape of the Lenticular lens sheet constitutes a straight line shape in environments of high temperature and the like. When the size of the warp is enlarged to solve this problem, a paring of the top and so on of the Fresnel lens is liable to occur due to the abrasion of the sheet at a region in which the macroscopic cross-sectional shape of the lens sheet constitutes a curved line shape. For this reason, it is difficult to remove the problems of elimination of the gap between the sheets and prevention of paring of the top and so on of the Fresnel lens simultaneously.

In addition, in order to prevent the paring of the top of the Fresnel lens and so on due to the abrasion caused by vibration during transportation, the attachment of a tape to the outer circumferential part of the lens sheets or front plate has been performed by operators. However, there are times when the lens is damaged during the application of the tape, because this operation is complicated.

SUMMARY OF THE INVENTION

In view of the foregoing, it is an object of the present invention to prevent the paring of the top of the Fresnel lens and so on due to the abrasion caused by the vibration during transportation without the need for a tape attachment operation on the outer circumferential part of the lens sheets and so on in a rear-projection type screen which is configured by the combination of a Fresnel lens sheet and Lenticular lens sheet and so on.

According to one aspect of the present invention, for achieving the above-mentioned object, there is provided a rear-projection type screen configured from two or more overlapping sheet-like members, including a fixing protrusion integrally formed in the sheet-like member in such way that neither of the two sheet-like members is displaced from the state in which the two sheet-like members overlap. The rear-projection type screen is configured from, by way of example, (1) two sheet-like members comprising a Lenticular lens sheet and a Fresnel lens sheet, or (2) three sheet-like members comprising a Lenticular lens sheet, a Fresnel lens sheet and front plate. Consequently, the sheet-like members from which rear-projection screen is configured further include a protrusion which is integrally formed in the sheet-like members, used to attach the rear-projection screen to the main body of a rear-projection image display apparatus or to a screen frame. The above-mentioned attachment protrusion may be integrally formed independently without the provision of the above-mentioned fixing protrusion in the sheet-like member from which the rear-projection screen is configured. Further, a protrusion may be integrally formed in the sheet-like member for the purpose of generating a gap between the front end section of the lens in one of the sheet-like members and the other sheet member when the two sheet-like members overlap. This gap may be of a magnitude to allow the front end section of the lens in one of the sheet-like members comes into partial contact with the other sheet-like member. The above-mentioned three protrusions are provided outside the effective region of the image range.

The above and further objects and novel features of the invention will more fully appear from the following detailed description when the same is read in connection with the accompanying drawings. It is to be expressly understood, however, that the drawings are for purpose of illustration only and are not intended as a definition of the limits of the invention.

BRIEF DESCRIPTION OF THE DIAGRAMS

DESCRIPTION OF THE PREFERRED EMBODIMENTS

Figure 1:
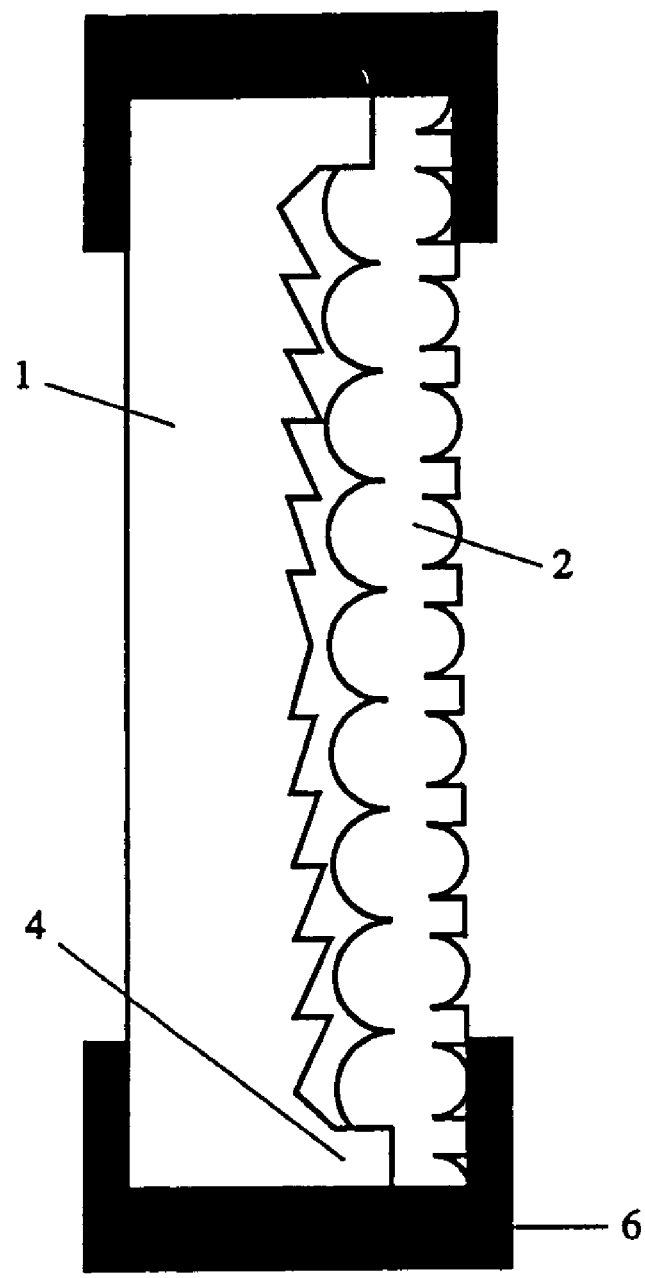
FIG. 1 is a perspective view that shows one example of the rear-projection type screen according to the present invention.
Figure 2:
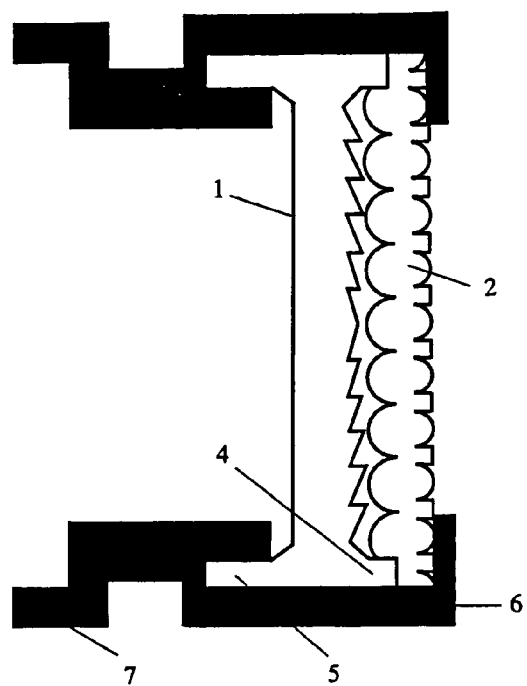
FIG. 2 is a perspective view that shows another example of the rear-projection type screen according to the present invention.

A schematic diagram of one example of a rear-projection type screen according to the present invention is shown in FIG. 1 and FIG. 2. The rear-projection type screen shown in FIG. 1 comprises a Fresnel lens sheet 1 and a Lenticular lens sheet 2, and a protrusion 4 is integrally formed in the Fresnel lens sheet 1 at the Lenticular lens sheet 2 side of a region outside the image range. As shown in FIG. 1, a hollow place corresponding to the protrusion 4 is formed in the Lenticular lens sheet 2 at the Fresnel lens sheet 1 side. By the fitting of the protrusion 4 of the Fresnel lens sheet 1 into the hollow place of the Lenticular lens sheet 2 both are fixed. As a result, the tape attachment operation in the outer circumferential part of both sheets is unnecessary. The rear-projection type screen shown in FIG. 2 comprises a Fresnel lens sheet 1, a Lenticular lens sheet 2 and a protrusion 4, which is integrally formed in the Fresnel lens sheet 1 at the Lenticular lens sheet 2 side of a region outside the image range, for fixing both lens sheets. The rear-projection type screen shown in FIG. 2 further comprises a protrusion 5, which is provided in the Fresnel lens sheet 1 at the rear side of region outside the image range, for fixing in a screen frame 6 and an attachment part 7 for the main body of rear-projection type image display apparatus. The fixing protrusion 5 may be fixed to just either the screen frame 6 or the attachment part 7 for the main body of the rear-projection type image display apparatus. It is preferable that the above-noted two protrusions 4,5 shown in FIG. 2 be formed of a material which is the same as the material for the main body section of the lens sheets. In the case in which different materials are employed for the protrusion and the main body section, there is a possibility that peeling will occur at the interface of the different materials and, by the differences in thermal expansion and water absorption, waviness or wrinkles will occur.

Figure 3:
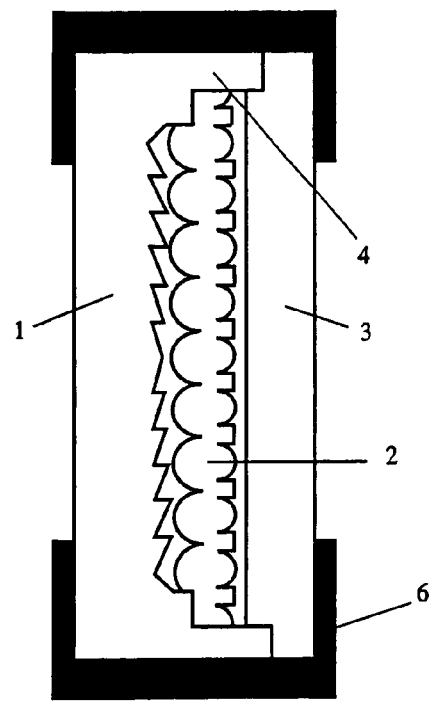
FIG. 3 is a perspective view that shows another example of the rear-projection type screen according to the present invention.
Figure 4:
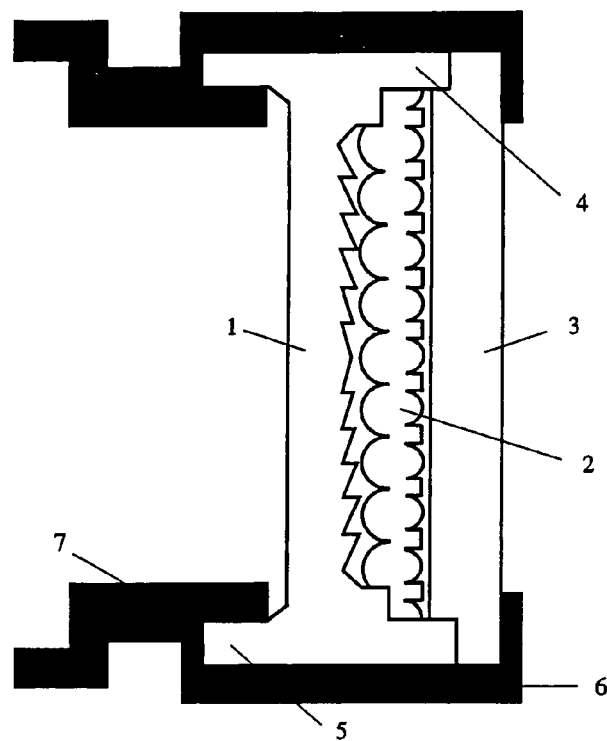
FIG. 4 is a perspective view that shows another example of the rear-projection type screen according to the present invention.

Schematic diagrams of another example of a rear-projection type screen based on the present invention are shown in FIG. 3 and FIG. 4. The rear-projection type screen shown in FIG. 3 and FIG. 4 comprises a Fresnel lens sheet 1, Lenticular lens sheet 2 and front plate 3. In the rear-projection type screen shown in FIG. 3, a fixing protrusion 4 is integrally formed in the Fresnel lens sheet 1 in such a way that the Fresnel lens sheet 1, Lenticular lens sheet 2 and front plate 3 are not displaced. In the rear-projection type screen shown in FIG. 4, a fixing protrusion 4, such that the Fresnel lens sheet 1, Lenticular lens sheet 2 and front plate 3 are not displaced, and a protrusion 5, used for attachment to screen frame 6 and an attachment part 7 of the rear-projection type image display apparatus main body, are integrally formed in the Fresnel lens sheet 1.

Figure 5:
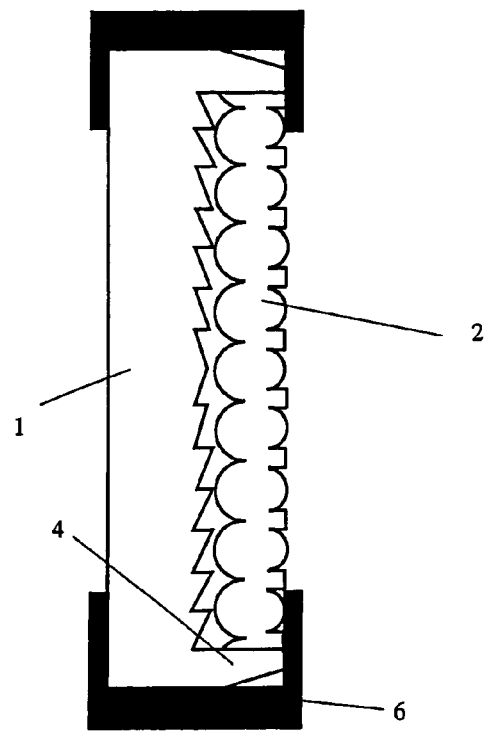
FIG. 5 is a perspective view that shows another example of the rear-projection type screen according to the present invention.
Figure 6:
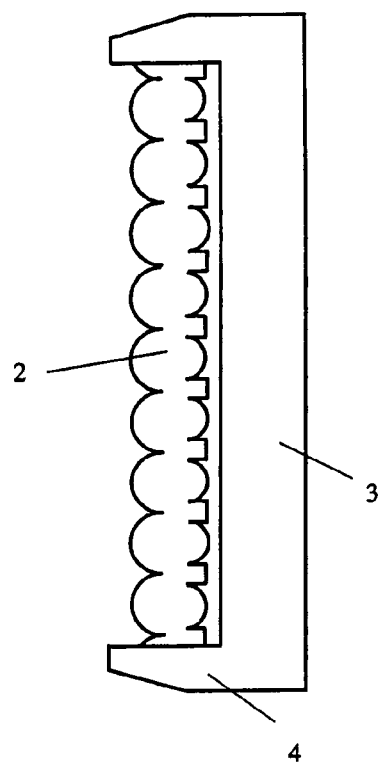
FIG. 6 is a perspective view that shows another example of the rear-projection type screen according to the present invention.

Although a hollow place of the rear projection screen shown in FIGS. 1 to 4 is provided in the Lenticular lens sheet 2 which corresponds to the protrusion 4 of the Fresnel lens sheet 1 and, as shown in FIG. 5, the entire Lenticular lens sheet 2 may be fitted in the Fresnel lens sheet 1 without a hollow place being used in the Lenticular lens sheet 2. Also the entire Lenticular lens sheet 2 may be inserted in a front plate 3 in which a protrusion 4 is provided at both edges of the front plate 3 as shown in FIG. 6.

Figure 7:
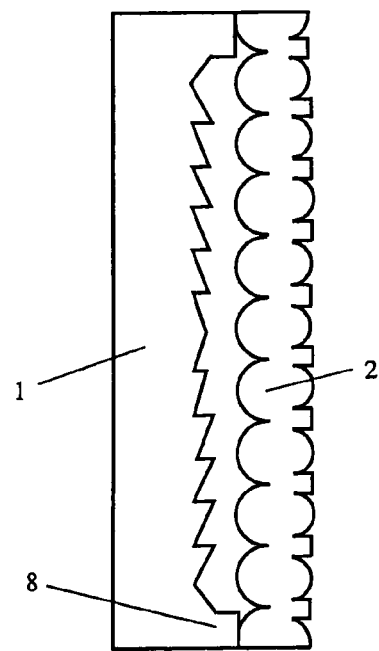
FIG. 7 is a perspective view that shows another example of the rear-projection type screen according to the present invention.
Figure 8:
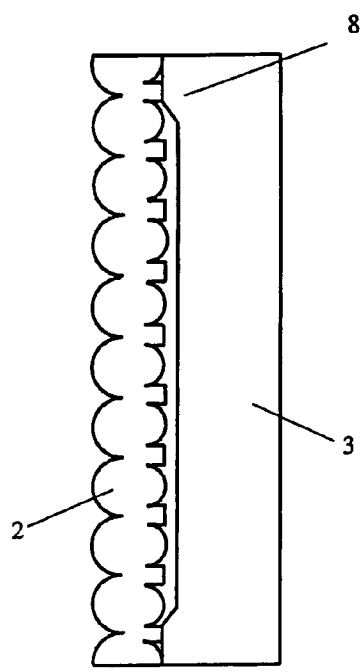
FIG. 8 is a perspective view that shows another example of the rear-projection type screen according to the present invention.

Schematic diagrams of another example of a rear-projection type screen based on the present invention are shown in FIG. 7 and FIG. 8. In the rear-projection type screen shown in FIG. 7, a protrusion 8, which produces a gap between the top of the lens of both lens sheets in a state in which the Fresnel lens sheet 1 and Lenticular lens sheet 2 overlap, is provided in the Fresnel lens sheet 1. In the rear-projection type screen shown in FIG. 8, a protrusion 8, which produces a gap between the top of the lens of the Lenticular lens sheet 2 and the front plate 3 in a state in which the Lenticular lens sheet 2 and front plate 3 overlap, is provided in the front plate 3. It is preferable that the gap be 0.1 mm or above. However, because the resolution of the projected image is worsened as the magnitude of this level difference increases, it is preferable that the gap be 2.0 mm or less.

The Fresnel lens sheet can be formed by injection-molding using, for example, an acrylic resin, polycarbonate resin, a polyolefine resin, a polystyrene resin, and a thermoplastic elastomer resin or a copolymer resin of these. In addition, the Fresnel lens sheet can be molded by a press-molding method and a photo-polymerization (2P) method in which an ultraviolet cured resin is employed. The Lenticular lens sheet can be molded by, for example, extrusion-molding in which an acrylic resin is employed. The above-mentioned 3 types of protrusions can be molded by the advance-processing, in a metal mold employed in injection-molding or a stamper which is used together with the metal mold, of an inverse mold for the protrusion.

Figure 9:
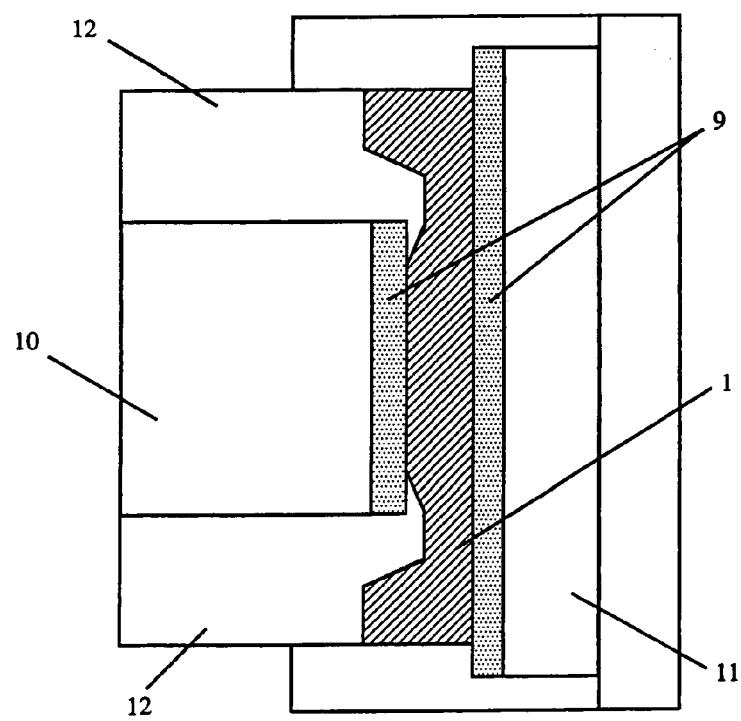
FIG. 9 is a schematic diagram of one example of an injection molder used for the molding of the Fresnel lens sheet by an injection-molding method.
Figure 10:
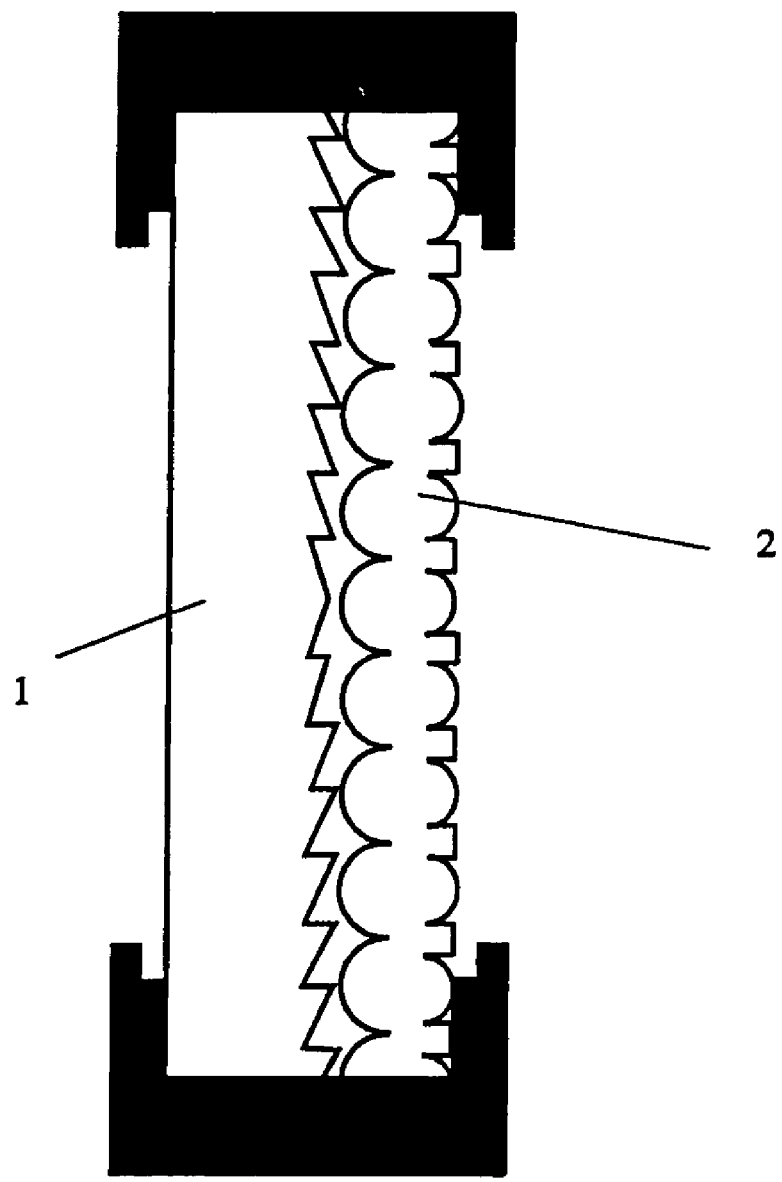
FIG. 10 is a schematic diagram of a rear-projection type screen of the prior art employed in a rear-projection type television set.
Figure 11:
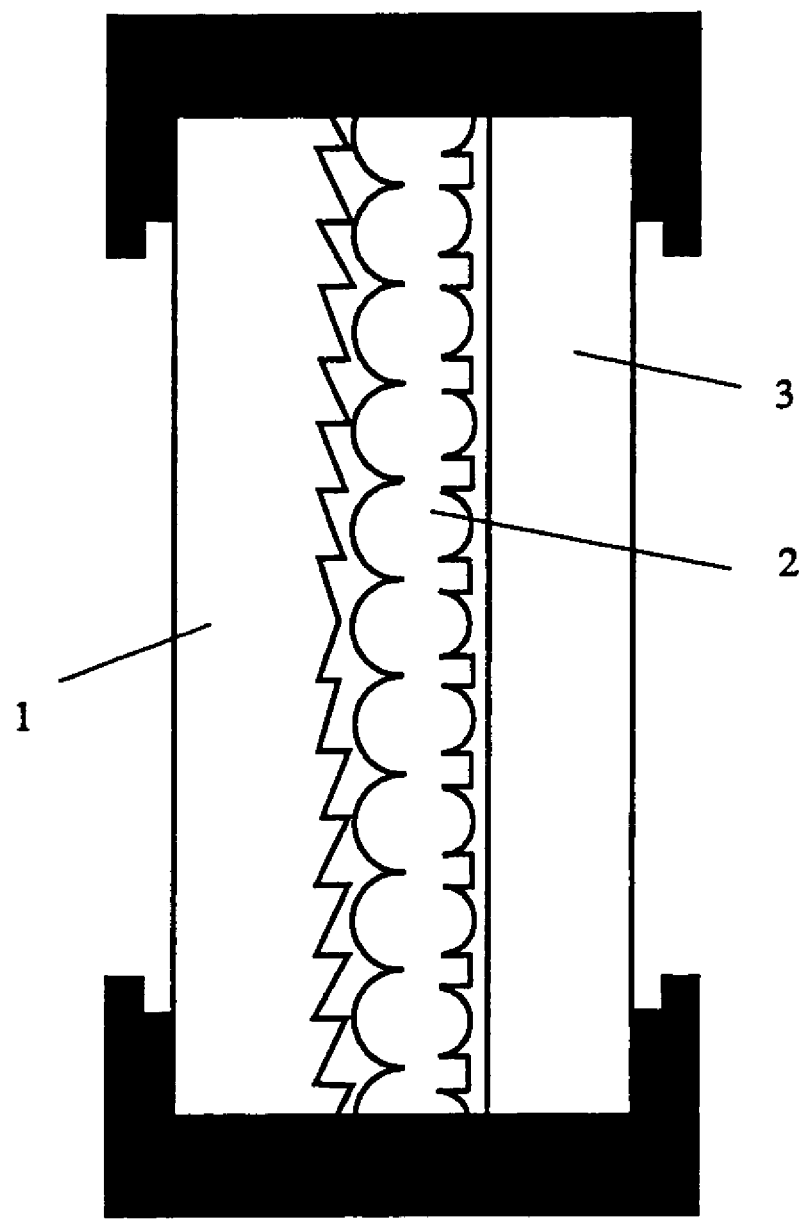
FIG. 11 is a schematic diagram of a rear-projection type screen of the another prior art employed in a rear-projection type television set.

An example of an injection molder used for the molding of the Fresnel lens sheet 1 by an injection-molding method is shown in FIG. 9. In the injection-molding method, a stamper 9 is attached to a fixed mirror 10 side and movable mirror 11 side. The stamper 9 is attached using a stamper holder 12 to the fixed mirror surface 10 side. The shape of the protrusion formed in the Fresnel lens sheet 1 is determined by the shape of the stamper holder 12, and the shape of the stamper holder 12 should be changed in accordance with the protrusion which is to be formed in the Fresnel lens sheet 1.

Based on the present invention, a rear-projection type screen can be provided in which, without the need for a tape attachment operation on the outer circumferential part of the lens sheets and so on, the paring of the top of the Fresnel lens and so on due to the abrasion caused by the vibration during transportation can be prevented.

While preferred embodiments of the present invention have been described using specific terms, such description is for illustrative purposes only, and it is to be understood that changes and variations may be made without departing from the spirit or scope of the following claims.

What is claimed is:

1. A method of manufacturing a rear-projection type screen having two or more overlapping sheet-like members selected from a group consisting of a Fresnel lens sheet, a Lenticular lens sheet having a hollow place formed therein, a front plate, and a protrusion integrally formed on the Fresnel lens sheet, said protrusion being fitted within the hollow place of the Lenticular lens sheet and protruding from a second overlapping sheet-like member of the two or more overlapping sheet-like members, the method comprising steps of:
fabricating an inverted mold of the protrusion into a metal mold or a stamper;
forming the two or more overlapping sheet-like members with the protrusion integrally formed thereon by injection molding using the metal mold or the stamper; and
overlapping a first overlapping sheet-like member of the two or more overlapping sheet-like members and the second overlapping sheet-like member of the two or more overlapping sheet-like members to produce a gap between a front end of a lens on the first overlapping sheet-like member of the two or more overlapping sheet-like members and the second overlapping sheet-like member of the two or more overlapping sheet-like members, said gap extending over an entire screen image effective region of the screen, said protrusion of the Fresnel sheet and said hollow place of the Lenticular lens sheet being positioned outside the screen image effective area of the screen.

2. The method of manufacturing the rear-projection type screen according to claim 1, which comprises mounting the stamper on a stamper holder.

3. The method of manufacturing the rear-projection type screen according to claim 1, which comprises mounting the stamper on both surfaces of the sheet-like members.

4. The method of manufacturing the rear-projection type screen according to claim 1, wherein the sheet-like members are made of any one of acrylic resin, polycarbonate resin, polyolefin resin, polystyrene resin, thermoplastic elastomer resin, and copolymerized resin thereof.

5. The method of manufacturing a rear-projection type screen according to claim 1, which comprises forming the protrusion so as to protrude from the second overlapping sheet-like member of the two or more overlapping sheet-like members.

6. The method of manufacturing a rear-projection type screen according to claim 1, wherein the gap has a length which is in a range of being equal to or greater than 0.1 mm and being equal to or less than 2.0 mm.

7. A method of manufacturing a rear-projection type screen having two or more overlapping sheet-like members selected from a group consisting of a Fresnel lens sheet, a Lenticular lens sheet, and a front plate, wherein first and second protrusions are formed in the Fresnel lens sheet, the Lenticular lens sheet has a hollow place into which one of the first and second protrusions of the Fresnel lens sheet is fitted, the screen having a main body or screen frame having a hollow place into which one of the first and second protrusions of the Fresnel lens sheet is fitted, a gap is formed between the Fresnel lens sheet and the Lenticular lens sheet over the entire area of the screen image effective region of the screen and the first and second protrusions and the hollow place of the Lenticular lens are located outside the screen image effective region of the screen, the method comprising steps of:
fabricating an inverted mold of each of the first and second protrusions into a metal mold or a stamper;
forming the two or more overlapping sheet-like members with the first and second protrusions integrally formed thereon by injection molding using the metal mold or the stamper; and
attaching the two or more overlapping sheet-like members either to a main body of a rear-projection type image display apparatus or to a screen frame of the rear-projection type screen.

8. The method of manufacturing the rear-projection type screen according to claim 7, which comprises mounting the stamper on a stamper holder.

9. The method of manufacturing the rear-projection type screen according to claim 7, which comprises mounting the stamper on both surfaces of the sheet-like members.

10. The method of manufacturing the rear-projection type screen according to claim 7, wherein the sheet-like members are made of any one of acrylic resin, polycarbonate resin, polyolefin resin, polystyrene resin, thermoplastic elastomer resin, and copolymerized resin thereof.

11. A method of manufacturing a rear-projection type screen having three overlapping sheet-like members, wherein a first sheet-like member of the three overlapping sheet-like members has a hollow place, a second sheet-like member of the three overlapping sheet-like members is placed between the first sheet-like member of the three overlapping sheet-like members and a third sheet-like member of the three overlapping sheet-like members, and a protrusion is integrally formed to protrude from the third sheet-like member, the method comprising steps of:
fabricating an inverted mold of the protrusion into a metal mold or a stamper; forming the three overlapping sheet-like members with the protrusion integrally formed thereon by injection molding using the metal mold or the stamper; and
fitting the protrusion in the hollow place in the first sheet-like member of the three overlapping sheet-like members to entirely fit the second sheet-like member of the three overlapping sheet-like members between the first sheet-like member and the third sheet-like member wherein the first sheet-like member comprises a front plate, the second sheet-like member comprises a Lenticular lens sheet, the third sheet-like member comprises a Fresnel lens sheet, the Lenticular lens sheet having the hollow place formed therein into which at least part of the protrusion that is formed in the Fresnel lens sheet is fitted, the protrusion and the hollow place of the Lenticular lens sheet are located outside the screen image effective region of the screen, and wherein a gap is created between the Fresnel lens sheet and the Lenticular lens sheet and is positioned within the entire area of the screen image effective region of the screen.

12. The method of manufacturing the rear-projection type screen according to claim 11, which comprises mounting the stamper on a stamper holder.

13. The method of manufacturing the rear-projection type screen according to claim 11, which comprises mounting the stamper on both surfaces of the sheet-like members.

14. The method of manufacturing the rear-projection type screen according to claim 11, wherein the sheet-like members are made of any one of acrylic resin, polycarbonate resin, polyolefin resin, polystyrene resin, thermoplastic elastomer resin, and copolymerized resin thereof.

15. A method of manufacturing a rear-projection type screen having two overlapping sheet-like members, wherein a first sheet-like member of the two overlapping sheet-like members has a protrusion being integrally formed to protrude therefrom, and a second sheet-like member of the two overlapping sheet-like members has a hollow place, the method comprising steps of:
    fabricating an inverted mold of the protrusion into a metal mold or a stamper;
    forming the first overlapping sheet-like member with the protrusion formed integrally thereon by injection molding using the metal mold or the stamper; and
    fixing the first overlapping sheet-like member to the second overlapping sheet-like member by fitting of the protrusion of the first overlapping sheet-like member into the hollow place of the second sheet-like member wherein the first sheet-like member comprises a Fresnel lens sheet, the second sheet-like member comprises a Lenticular lens sheet, and the protrusion and the hollow place of the Lenticular lens sheet are located outside the screen image effective region of the screen.

16. The method of manufacturing the rear-projection type screen according to claim 15, which comprises mounting the stamper on a stamper holder.

17. The method of manufacturing the rear-projection type screen according to claim 15, which comprises mounting the stamper on both surfaces of the sheet-like members.

18. The method of manufacturing the rear-projection type screen according to claim 15, wherein the sheet-like members are made of any one of acrylic resin, polycarbonate resin, polyolefin resin, polystyrene resin, thermoplastic elastomer resin, and copolymerized resin thereof.

* * * * *